United States Patent [19]
Dumont, Jr.

[11] Patent Number: 5,938,395
[45] Date of Patent: Aug. 17, 1999

[54] RETRACTABLE CARRIER-PLATFORM DEVICE

[76] Inventor: John W. Dumont, Jr., P.O. Box 149, Monmouth, Me. 04259

[21] Appl. No.: 09/079,660

[22] Filed: May 15, 1998

Related U.S. Application Data

[63] Continuation-in-part of application No. 08/985,887, Dec. 16, 1997, which is a continuation-in-part of application No. 08/971,225, Nov. 15, 1997, abandoned.

[51] Int. Cl.$^6$ ........................................................ B60P 3/06
[52] U.S. Cl. ............................ 414/462; 224/497; 224/504
[58] Field of Search .............................. 414/462; 224/402, 224/497, 502, 503, 504, 506, 509

[56] References Cited

U.S. PATENT DOCUMENTS

| | | | |
|---|---|---|---|
| 3,348,713 | 10/1967 | Will | 414/462 |
| 3,891,132 | 6/1975 | Chandler | 414/462 |
| 3,913,811 | 10/1975 | Spencer | 224/42.08 |
| 3,921,842 | 11/1975 | Campbell | 414/462 |
| 4,705,448 | 11/1987 | Mungons | 414/462 |
| 5,011,361 | 4/1991 | Peterson | 414/462 |
| 5,467,910 | 11/1995 | Ritter et al. | 224/502 |
| 5,615,814 | 4/1997 | Dechant | 224/502 |
| 5,680,976 | 10/1997 | Koliopoulos et al. | 414/462 |

Primary Examiner—Dean Kramer
Assistant Examiner—Gregory A Morse
Attorney, Agent, or Firm—Thomas L. Bohan

[57] ABSTRACT

A carrier-platform device mountable on a utility vehicle. The carrier-platform device includes a frame attached to a standard, front-end snowplow-receiving bracket and a platform attached to the frame. The platform has three degrees of movement. The platform is pivotable from a vertical storage position to a horizontal deployed position. In the deployed position, the platform is further extendable so as to adjust the overall width of the carrier-platform device. The platform is still further adjustable in that the platform is able to be tilted in a ramp-like manner towards the ground. This arrangement allows an item such as an ATV or snowblower to be maneuvered from ground level and onto the platform so as to be transported by the utility vehicle atop the carrier-platform device.

20 Claims, 16 Drawing Sheets

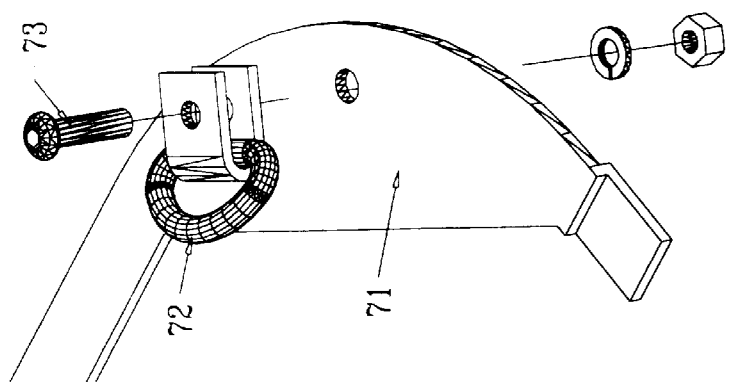
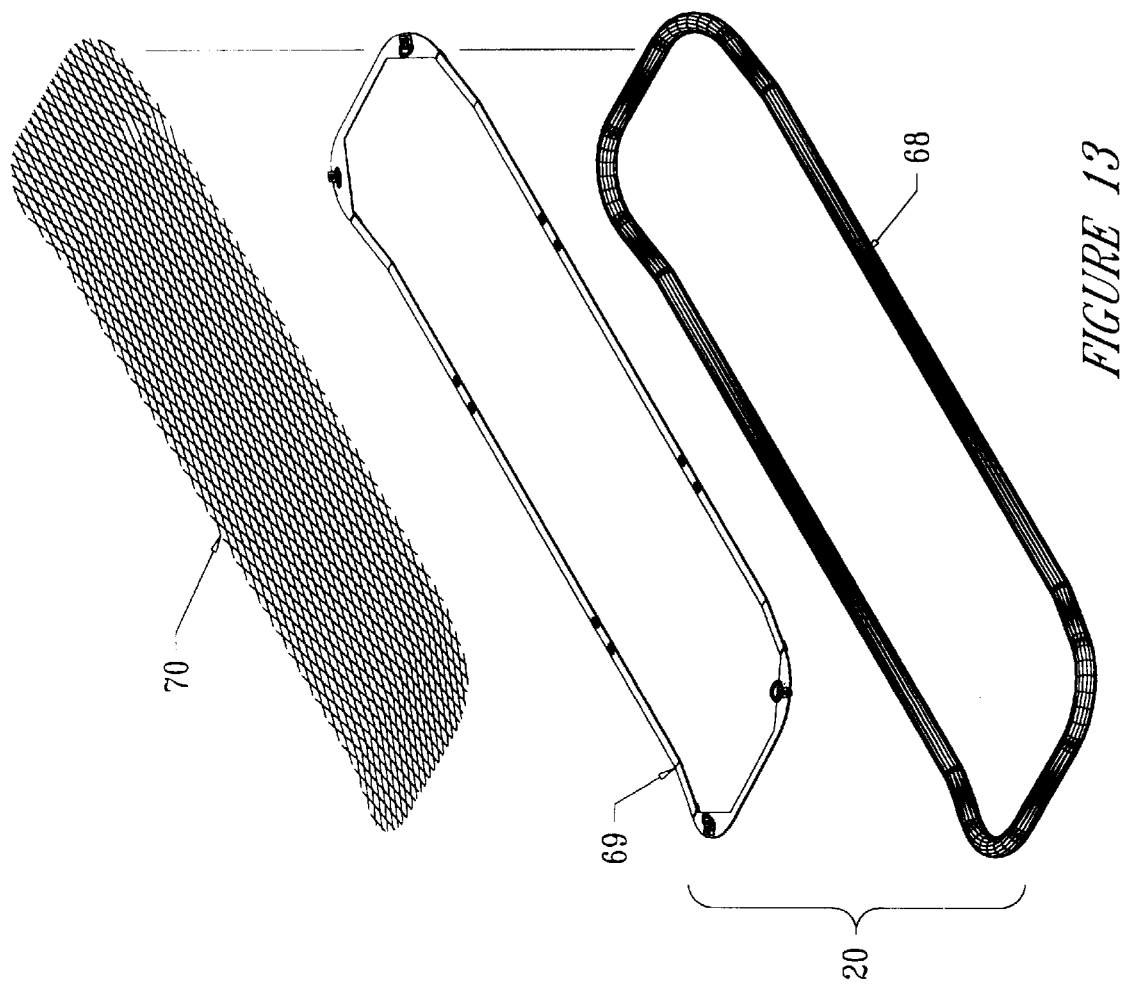

RETRACTABLE CARRIER-PLATFORM DEVICE

CROSS-REFERENCE TO RELATED PATENT APPLICATION

This application is a continuation-in-part (CIP) of the John W. Dumont, Jr. U.S. patent application Ser. No. 08/985,887 filed on Dec. 16, 1997, which was a CIP of the John W. Dumont, Jr. U.S. patent application Ser. No. 08/971,225 filed on Nov. 15, 1997, now abandoned.

BACKGROUND OF THE INVENTION

1. Field of Invention

The present invention relates to the field of mechanical attachments to vehicles. More particularly, the present invention relates to a device for providing a mechanical attachment in the form of a retractable carrier-platform device. More particular yet, the present invention involves a retractable carrier-platform device, where the carrier-platform device is attached to the front-end or the rear-end of the vehicle via standard plow-receiving couplings or customized couplings.

2. Description of Prior Art

Vehicles such as trucks and similar utility-vehicles are commonly used to transport smaller vehicles and mechanisms. Such smaller mechanisms include small tractors, lawn mowers, three-wheeled or four-wheeled all-terrain-vehicles (ATV's), motorcycles, mopeds, bicycles, snowblowers, and other similar items. In general, these items are loaded onto a flatbed or fixed-platform by physically lifting the item thereupon. Alternatively, the utility-vehicle is driven to a steep hillside such that the flatbed or platform abuts the hillside. In this way, the item to be transported may be wheeled thereupon. During either of these loading methods, significant effort must be expended by those individuals performing the loading. More often than not, several people must be involved in this loading process. In either the lifting method or hillside method, there exists a very real danger of loss of control over the item being loaded resulting in the item being lifted either dropping or overturning on the slope. Indeed, there are numerous injuries each year due to such occurrences. Accordingly, platforms attachable to the utility-vehicle near ground-level have been made available, to a limited extent, as a means to reduce lifting obligations associated with the item being transported.

In the field of utility-vehicle platforms, there have been several attempts to provide load-carrying platforms. In general, because of the limited features and fixed nature of such platforms, these efforts have failed to fully resolve the abovementioned problems. Some attempts have even been so complex in design so that they offset any benefits otherwise offered. Indeed, the time and effort involved in using complex and inefficient platform devices is self-defeating. In an attempt at simplification, some prior-art devices have turned to utilizing front-end snow-plow-receiving brackets to mount a platform. However, such prior-art platforms typically still require substantial manual lifting.

One prior-art carrier device is that of Dechant (U.S. Pat. No. 5,615,814), and involves an equipment-carrier assembly mounted to a snowplow-mounting bracket. Although the device of Dechant provides a platform for carrying items, it is limited to those small items such as toolboxes and the like that can be lifted directly into tray sections of the platform. Items of any greater size, in particular rider mowers and the like, are therefore unable to be transported by the device of Dechant.

Other prior-art carrier devices that exist are deficient for the same reasons as is the Dechant device. A general defect of prior-art carrier devices is that they are limited to a platform which cannot carry large items nor enable easy loading. Similar deficient prior-art carrier devices are disclosed by Gittins (GB #2,170,460) and Monckmeier (U.S. Pat. No. 1,977,735). The device of Gittins includes a carrier device in the form of a front-bumper-mounted box that is coupled to a vehicle. The device of Monckmeier is a carrier device that is also bumper-mounted, though limited further in that it is only a platform upon which luggage or trunks may be lashed down.

Concurrent with the development of the prior-art carrier devices described above, other front-end load-carrying devices have been developed with the goal of enabling heavier loads to be placed thereupon. Typically, such prior-art devices are formed by a platform that swings down to a fixed horizontal position in the manner of a common tailgate. Two representative prior-art devices are those of Ritter et al. (U.S. Pat. No. 5,467,910) and Mascotte et al. (U.S. Pat. No. 4,099,760).

Ritter et al. includes a load-carrying platform that attaches to vehicles having a front-mounted or rear-mounted plow frame. The device of Ritter et al. exhibits several flaws, including, most importantly, the requirement that the item to be loaded thereupon must be lifted or moved onto the platform through the "hillside method" described above. Further, support chains that must be used form an obstruction that limits what may be placed on the Ritter et al. device. Similarly, the device of Mascotte et al. includes a swing-down platform that is bolted into a horizontal position and functions identically to the device of Ritter et al. though without the need of support chains. It should be noted that neither the device of Ritter et al. nor the device of Mascotte et al. resolves the onerous requirement that the item to be transported must be lifted onto the platform. As well, the "hillside method" is not avoided through the use of either of these prior-art devices. Therefore, each suffers from the persistent deficiencies seen throughout the prior art.

Accordingly, the prior art fails to provide any carrying device mountable on a vehicle that can be safely and quickly loaded with items so as to transport such items. Indeed, none of the prior art devices include a ramp for directly driving or otherwise moving such items thereupon. Therefore, what is needed is a carrier-platform device that is easily attached to a vehicle. What is also needed is such a device that is simply and easily deployable from a stowed position to a deployed and extendable position. Further, what is needed is such a device that ensures safe and fast loading and unloading of heavy items with minimal physical effort.

SUMMARY OF THE INVENTION

It is an object of the present invention to provide a carrier-platform device that is able to be mounted on any standard snowplow mounting bracket or, alternatively, via a customized mounting arrangement. Another object of the present invention is to provide a carrier-platform device that may be extended after deployment from a stowed position so as to create a platform having a variable width. Yet another object of the present invention is to provide releasable hinges that transform the carrier-platform device to a ramp-like structure that allows wheeled items to be rolled onto the platform quickly and easily without any direct lifting. Still another object of the present invention is to provide a carrier-platform device fabricated of durable-yet-lightweight material capable of supporting heavy items, including, but not limited to, ATVs. It is also an object of the present invention to provide such a carrier-platform device that is multi-seasonal and versatile for a variety of equipment to be transported on most any type of vehicle capable of supporting such equipment under a variety of circumstances.

The carrier-platform device of the present invention includes a base-frame with a pivoting platform that is movable between a vertical stowed position and a horizontal deployed position. The base-frame is preferably coupled to a standard plow-receiving bracket present on vehicles equipped to receive a snowplow such as the FISHER (TM) plow. An alternative bracketing system may be used, particularly when the device is to be deployed at the rear of a vehicle, or for other vehicles having suitable support bracket configurations, including, but not limited to, heavy farm equipment, military vehicles, municipal vehicles, campers, recreational vehicles, etc. The base-frame optionally includes lighting equipment to supplement normal vehicle headlamps as needed when the device is deployed at the front of the vehicle. The platform pivots about a base-coupling that is removably affixed to the base-frame.

It should be noted that the vehicle-end of the carrier-platform device, particularly the base-frame, may be made of slightly different designs which vary according to the particular receiving bracket that is available on the particular vehicle. For those vehicles having standard snowplow receiving brackets, generally only one or two major manufacturers of snowplows are found in any given locale. Accordingly, only one or two differing designs of the base-frame are needed in any given area of the country. The base-coupling and platform, however, do not differ according to the type of receiving bracket used. The receiving bracket is preferably designed to include means to adjust the overall height of the carrier-platform device as a function of the particular vehicle to which it is coupled. That may simply involve the introduction of a plurality of height-adjustment holes on the base-frame where it couples to the receiving bracket. Removable bolts are inserted into particular height-adjustment holes in accordance with the desired height of the deployed platform.

It is to be noted that a supplemental lifting mechanism may be coupled between the receiving bracket of the vehicle and the base-frame that is linked to the platform. Specifically, the supplemental rack mechanism may include a pair of parallel racks that run substantially parallel to the ground and that may be mechanically or electrically moved such that the platform is raised or lowered. Alternatively, the supplemental lifting mechanism may be a singular or multiple column arrangement running perpendicular to the ground and coupled to the base-frame in a manner operable much like a standard lift jack. For the device to be deployed at the front of the vehicle, the first and second lifting mechanisms may be coupled to the vehicle such that it extends beyond the front end of the vehicle. When the device is deployed at the rear of the vehicle, the receiving bracket may well be underneath the vehicle rather than at its end. In that situation, the supplemental lifting mechanism would be actuated mechanically or electrically while remaining substantially under the vehicle, with essentially just the platform extending outwardly from the rear end of the vehicle. Suitable lifting arrangements, electrical or mechanical, for either the front or the rear of the vehicle are readily contemplated by those skilled in the art.

The base-coupling of the present invention is hingedly attached to the platform and removably attached to the base-frame. The hinge design allows the platform to pivot between the vertical stowed position and horizontal deployed position, as well as to be locked into either of those positions. In a preferred embodiment of its design, the hinge design includes means to adjust the platform's forward tilt using a four-way adjustment block.

The removable aspect of the base coupling is accomplished by a disk-shaped protrusion on the base coupling that is slidable into and out of a retaining sleeve or yoke located on the light support. Two base couplings are preferably used, one on each side of the carrier platform. Because each base coupling is removably attached to the light support and because each disk-shaped protrusion is rotatable within its respective yoke, either end of the platform can be lowered by moving one of the disk-shaped protrusions within its yoke while the other one of the disk-shaped protrusions is rotatably captured within its yoke. Any suitable means for locking each disk-shaped protrusion within its respective yoke may be used. These include, but are not limited to, a spring-loaded locking pin. Such an arrangement provides two degrees of movement where the platform itself is hinged about the base couplings and also pivotable about either disk-shaped protrusion.

As an alternative to the pair of base couplings as the means for pivoting one end or the other of the platform toward the ground, a single centrally-located pivot system may be used. Another means for pivoting the platform toward the ground may be a pair of eccentric pivot arms. In particular, the use of a pair of pivot arms enables tilting of the platform to one side or another. It also optionally enables movement of the entire platform uniformly in one plane. Of course, any other means for pivoting the platform so as to tilt to one side or the other may be employed, provided it is structurally sufficient to tilt back to the horizontal position with the wheeled mechanism deployed on the platform. One such alternative involves the use of a ramp to aid in loading the equipment to be carried.

While two degrees of movement have been discussed, the platform also includes a fixed grate and a movable grate, where the movable grate provides a third degree of movement to the carrier-platform device. The movable grate is slidable between a position adjacent to the fixed grate and an extended position that creates a gap between the fixed grate and the movable grate. Each grate is basically a frame having a reinforced, flat surface therewithin. The surface can be fabricated from corrugated steel, cut-steel grating, welded cross-bars, weaved glass fiber materials such as KEVLAR (TM), or any suitably strong surface. Each end of each grate is upturned slightly. This upturned aspect creates a ramp-like feature when one disk-shaped protrusion is released from its sleeve allowing one end of the platform to touch the ground. As the grates are aligned parallel to one another, an item such as a four-wheeled ATV may easily be driven or rolled onto the upturned end, up the inclined platform, and onto the platform's grates. It should be noted that the third degree of movement enables the movable grate to be extended to the proper position to match the track-width of the vehicle or equipment to be hauled. In the instance of a three-wheeled ATV or similar item requiring a single, wide ramp, a supplemental fold-out ramp may be provided as lateral extensions to one or both of the grates.

Once an ATV or similar item is moved onto the grates, the platform is lifted by any suitable lifting means. The lifting means may be hydraulic, electric, or purely mechanical in design, including, but not limited to, a manually-operated or an electrically-operated lift jack. The primary requirement is that the lifting means be easy to operate so as to move the loaded platform to its horizontal position with each disk-shaped protrusion locked into its respective sleeve. A lever or crank mounted on the base-frame may be arranged to satisfy this requirement, provided it is designed to provide sufficient mechanical advantage to its user.

Although this discussion focuses on use of the present invention mounted on a front-end receiving bracket, any similar mounting bracket may utilized in any suitable orientation on the front or the rear of the vehicle. Also, for purposes of illustration, the present invention is discussed in terms of mounting on a snowplow-receiving bracket; however, it should be understood that the carrier-platform device is not intended to be limited to use with a snowplow's receiving bracket. The invention may be utilized in a variety of ways including, but not limited to, carrying small tractors, ATV's, mowers, motorcycles, mopeds, bicycles, snowblowers, or any similar items not exceeding the gross weight supportable by the vehicle upon which the invention is affixed.

It is to be understood that other objects and advantages of the present invention will become apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

BRIEF DESCRIPTION OF THE DRAWINGS

FIG. 13 is an exploded view of a carrier assembly in accordance with the preferred embodiment of the present invention. FIG. 13A is an exploded view of a corner section of the carrier assembly.

DETAILED DESCRIPTION OF THE PREFERRED EMBODIMENTS

Figure 1:
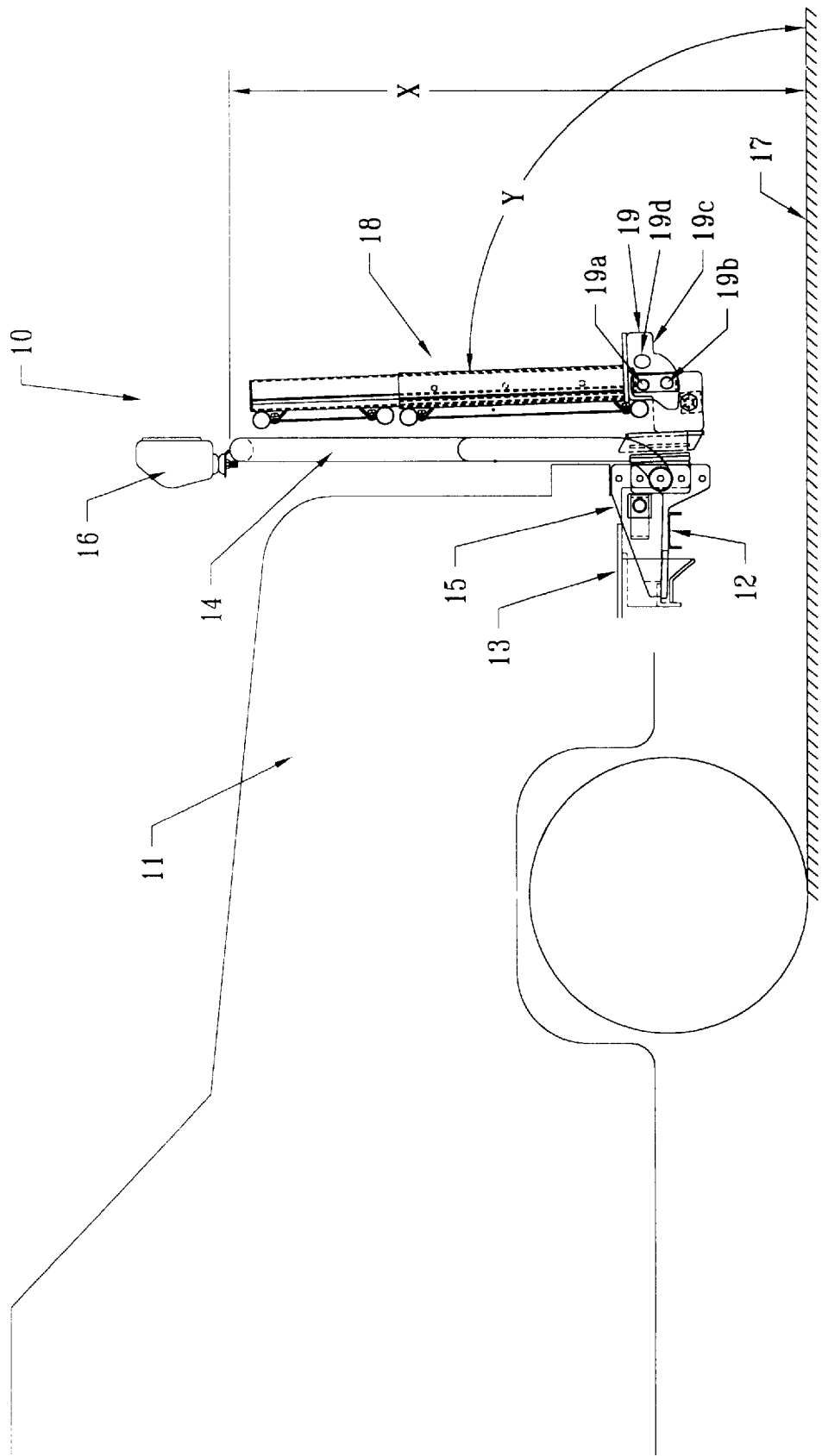
FIG. 1 is a side view of a carrier-platform device in accordance with the preferred embodiment of the present invention, showing the device coupled to a vehicle and in a stowed position.

In FIG. 1, a carrier-platform device 10 is shown according to the preferred embodiment of the present invention. The carrier-platform device 10 is connected to a vehicle 11 at a rear of the vehicle via a suitable attachment bracket, or the front of a vehicle, as shown in FIG. 1, at a conventional snowplow-receiving bracket 12 attached to a frame 13 of the vehicle 11, or even at both ends of the vehicle 11. The carrier-platform device 10 includes a light support 14 with a support connector 15 that is connected to the conventional snowplow-receiving bracket 12 in any known conventional manner. The light support 14 preferably includes a lighting means 16 that is preferably activated by way of an electrical coupling mechanism, such as an electrical harness of the type compatible with standard plow packages. The light support 14 serves as both the mount for the lighting means 16 (i.e., as a support) and as a form of protection for the front end of the vehicle 11. The support connector 15 includes height-adjustment holes 15a used to define the overall height of the device 10, and the height of the light support 14 and an extendable platform to be described herein in particular, as a function of the location of height-fixing bolts 15b shown in FIG. 5.

With continued reference to FIG. 1, one can see that the distance X between the top of the device 10 and the surface of the ground 17 is preferably no greater than the height of the front end of the vehicle 11, and absolutely not great enough so as to interfere with the driver's line of sight. The height of the centerline of the lighting means 16 is set by Federal statute at 54 inches above the surface, thereby essentially setting the value of X. The carrier-platform device 10 also includes an extendable platform 18 that is attached to a base-coupling 19 at a hinge 19a and lockable in the vertical position as shown by a base coupling locking means 19b. It is preferable that the platform, in its vertical position, a securing tilt of 91° or 92° from the horizontal, i.e., the platform 18 is able to lean toward the front grill of the vehicle 11. The locking means 19b is preferably a spring-loaded pin that forcibly resides within a first opening (shown occupied by the locking means 19b) in a manner to be described more fully herein. The platform 18 is movable along an arcuate path Y upon unlocking of the locking means 19b. This is the first degree of movement of the present invention. An abutting portion 19c and second opening 19d of the base coupling 19 are further explained with respect to FIG. 2.

Figure 2:
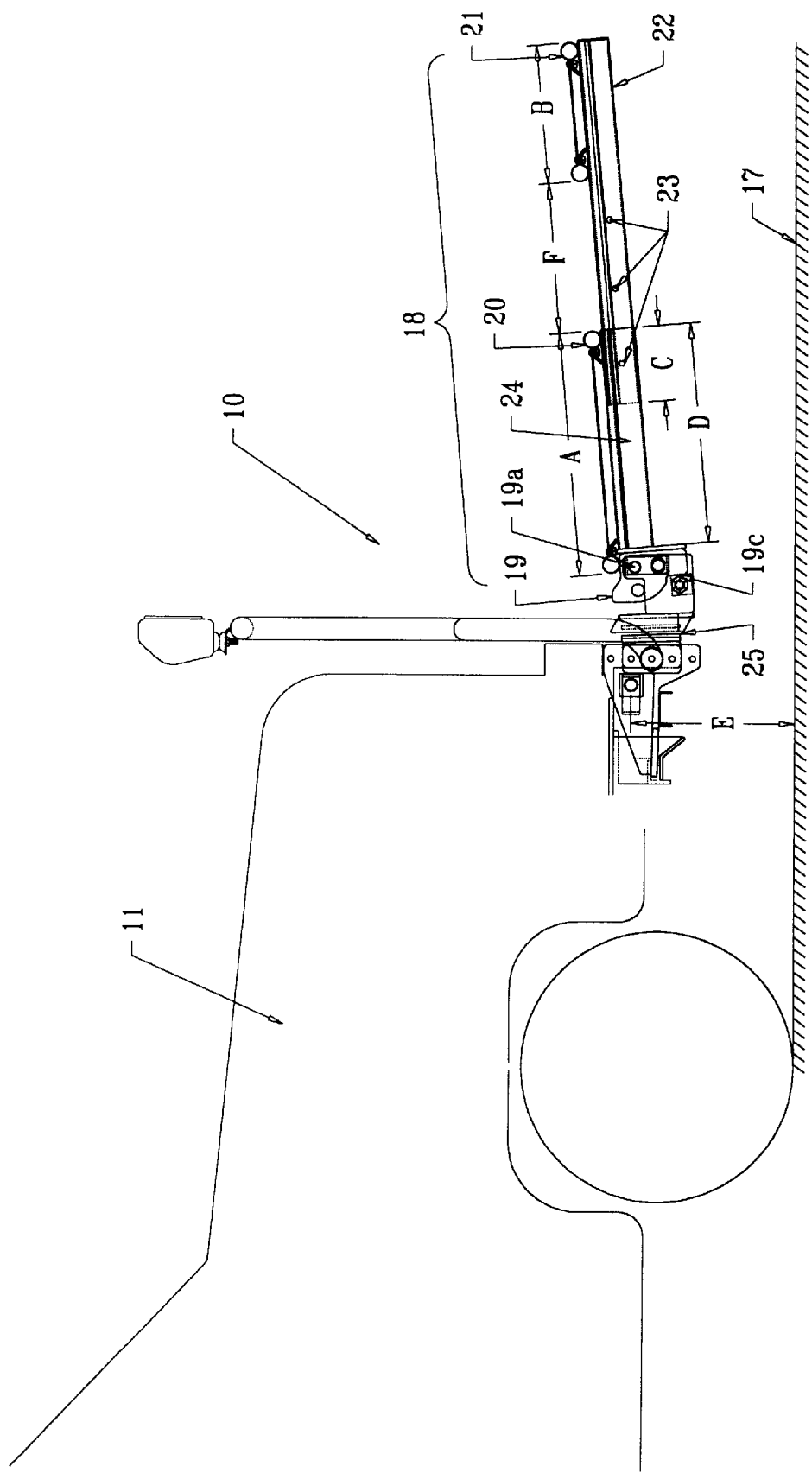
FIG. 2 is a side view of the carrier-platform device as shown in FIG. 1, showing the device coupled to a vehicle and in a deployed position.

In FIG. 2, the carrier-platform device 10 is shown in a horizontal deployed position. Further, platform 18 is shown in an extended position. This extended position is accomplished via a fixed frame 20 and a movable frame 21, each of which preferably includes a support grate coupled thereto. The movable frame 21 is affixed, preferably by bolting or welding, to a slidable support 22 that is locked into place by lock pins (or some similar means) located at adjustment holes 23 that enable linking of the slidable support 22 to a pivotable support 24. The movable frame 21 has a width B that is preferably a fraction (approximately one-half) of the width A of the fixed frame 20. This allows for a slidable adjustment distance F that enables items of differing widths to be carried. The fixed frame 20 is affixed to the pivotable support 24, also by welding.

The pivotable support 24 includes the base coupling 19 and is pivotable about the hinge 19a. The base coupling 19 provides for four-way adjustment of the position of the platform 18 in that it enables the user to select a particular coupling hole within which to insert locking means 19b. In that regard, the tilt of the platform 18 may be adjusted as a function of the design of the abutting portion 19c and use of the second opening 19d in a manner well known to those skilled in the art.

Figure 3:
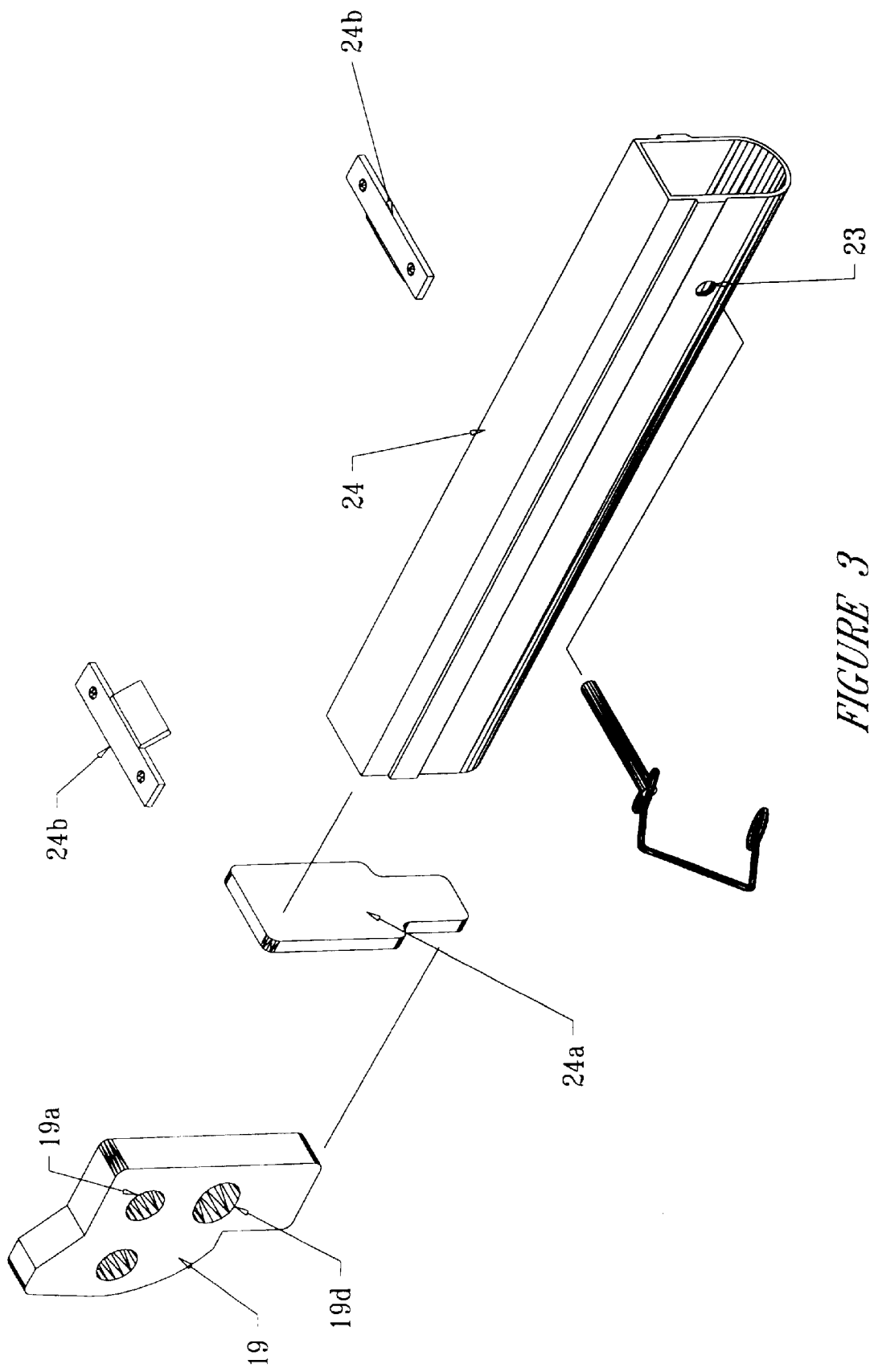
FIG. 3 is an exploded view of the primary support frame of the device.

As illustrated in FIG. 3, support 24 is preferably welded to hinge 19 by way of attachment bar 24a. Support couplings 24b enable attachment of the fixed frame 20 to the support 24. The abutting portion 19c acts as an adjustable stop for angular variation to maintain the platform 18 in its horizontal position at a distance E above the ground 17. It should be noted that a variety of dimensions may be utilized in the manufacture of the carrier platform device 10. However, as shown in FIG. 2 in order to ensure that the maximum load support capability of the vehicle may be relied upon, it has been found that the following dimensions are desirable: A=21 inches, B=12 inches, C=6.5 inches, D=19 inches, E=14 inches, and F=13 inches. It should be noted further that these measurements and load weights are not to be taken as restrictive and that any proportionally similar dimensions may be suitable. Variations may be made depending upon the particular limitations of the vehicle 11. The carrier platform device 10 also includes a third degree of movement—that of a side-to-side loading tilt—enabled, in part, by coupling 25 to be discussed more fully herein.

Figure 4:
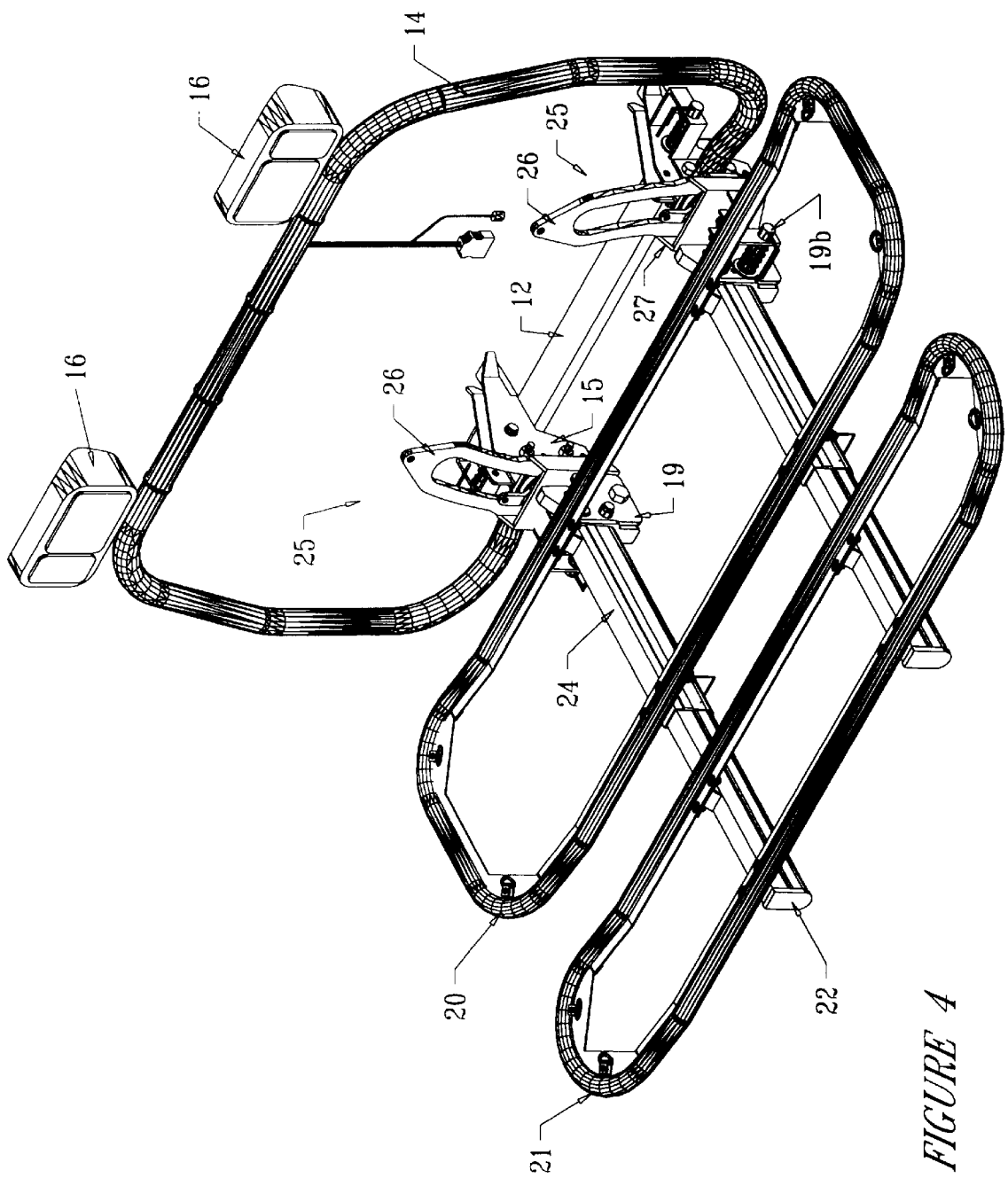
FIG. 4 is a front perspective view of the carrier-platform device in accordance with the preferred embodiment of the present invention, showing the carrier platform deployed.
Figure 5:
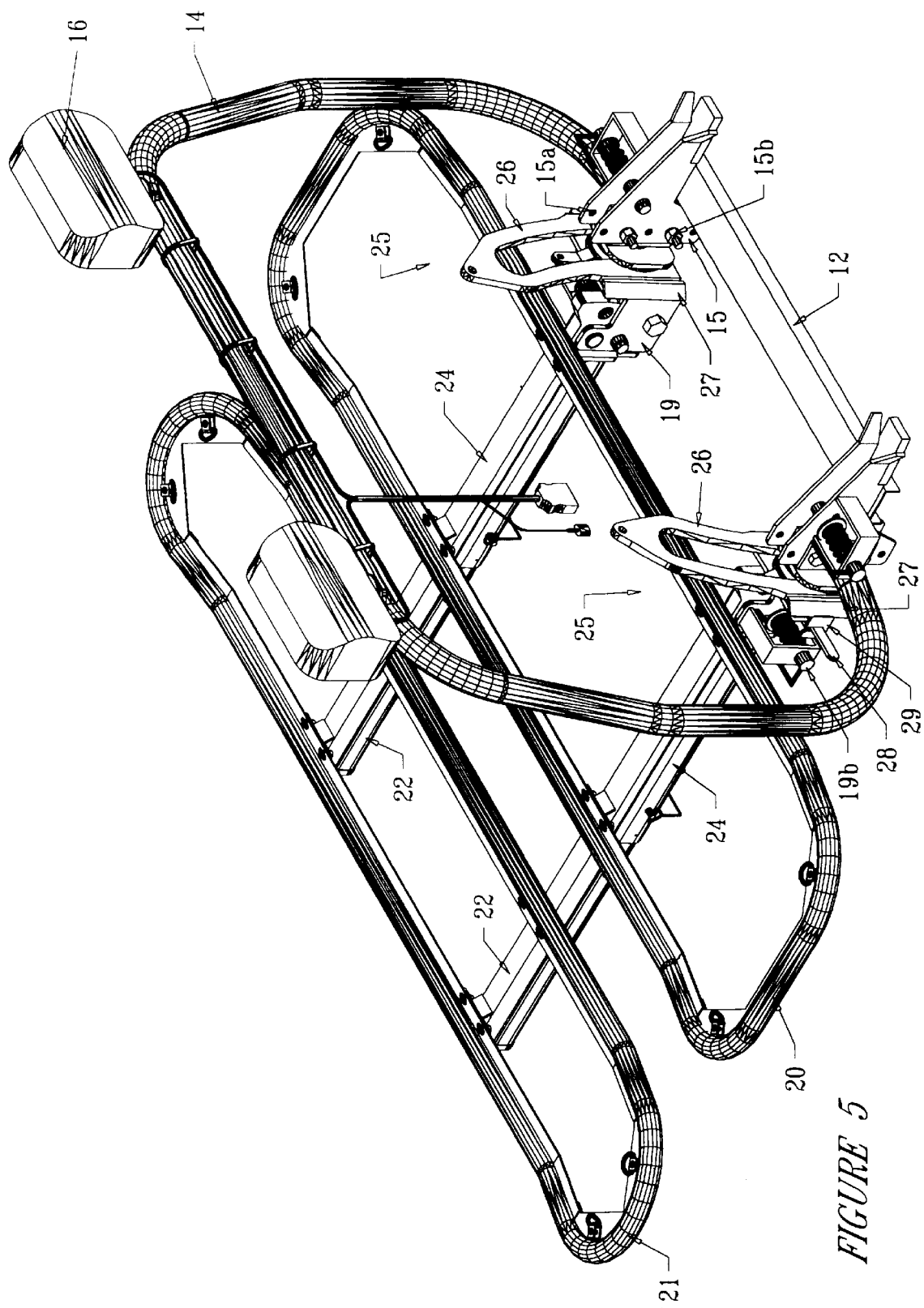
FIG. 5 is a rear perspective view of the carrier-platform device in accordance with the preferred embodiment of the present invention as shown in FIG. 2.
Figure 6:
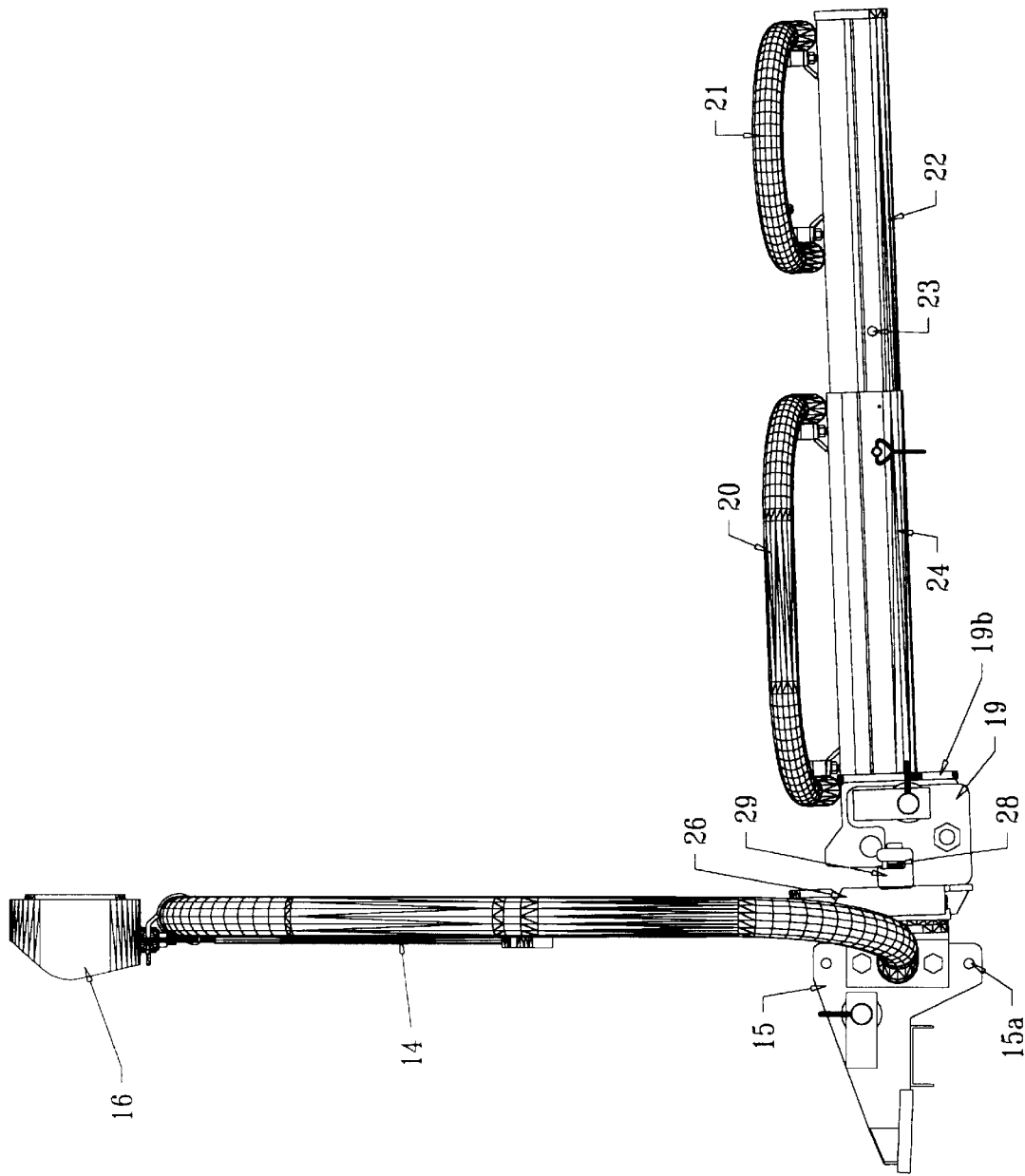
FIG. 6 is a side elevation view of the carrier-platform device in accordance with the preferred embodiment of the present invention as shown in FIG. 2.

FIGS. 4–6 further illustrate the design of the device 10 of the present invention, including the slide coupling 25 used to permit tilting of the device 10 so that the vehicle, equipment, etc., to be placed on the platform 18 may easily be driven thereon. There is preferably a pair of slide couplings 25, each having a slidable yoke 26 retained within a capture-hinge plate 27, to which the yoke 26 is preferably welded. When the device 10 is in a deployed carrying position or when it is in a stowed vertical position, the yokes are locked in place be means of a spring-loaded locking pin to be described herein. A release lever 28 is fixed within a harness 29 and holds the locking pin in place until it is forcibly moved out of harness 29. That releasing of the locking pin frees the yoke 26 and hinge plate 27 for movement downward while the other of the two yokes remains in place for pivoting of the platform 18. As can be seen from the drawings, the yoke 26 is of arcuate design such that its release for movement in conjunction with the hinge plate 27 causes pivoting of the platform 18 with respect to the other fixed yoke attachment point. This causes to tilt for loading about a horizontal axis that runs parallel to longitudinal axis of the vehicle the platform 18, as shown in FIG. 11, as the yoke 26 and hinge plate 27 drop down.

Figure 7:
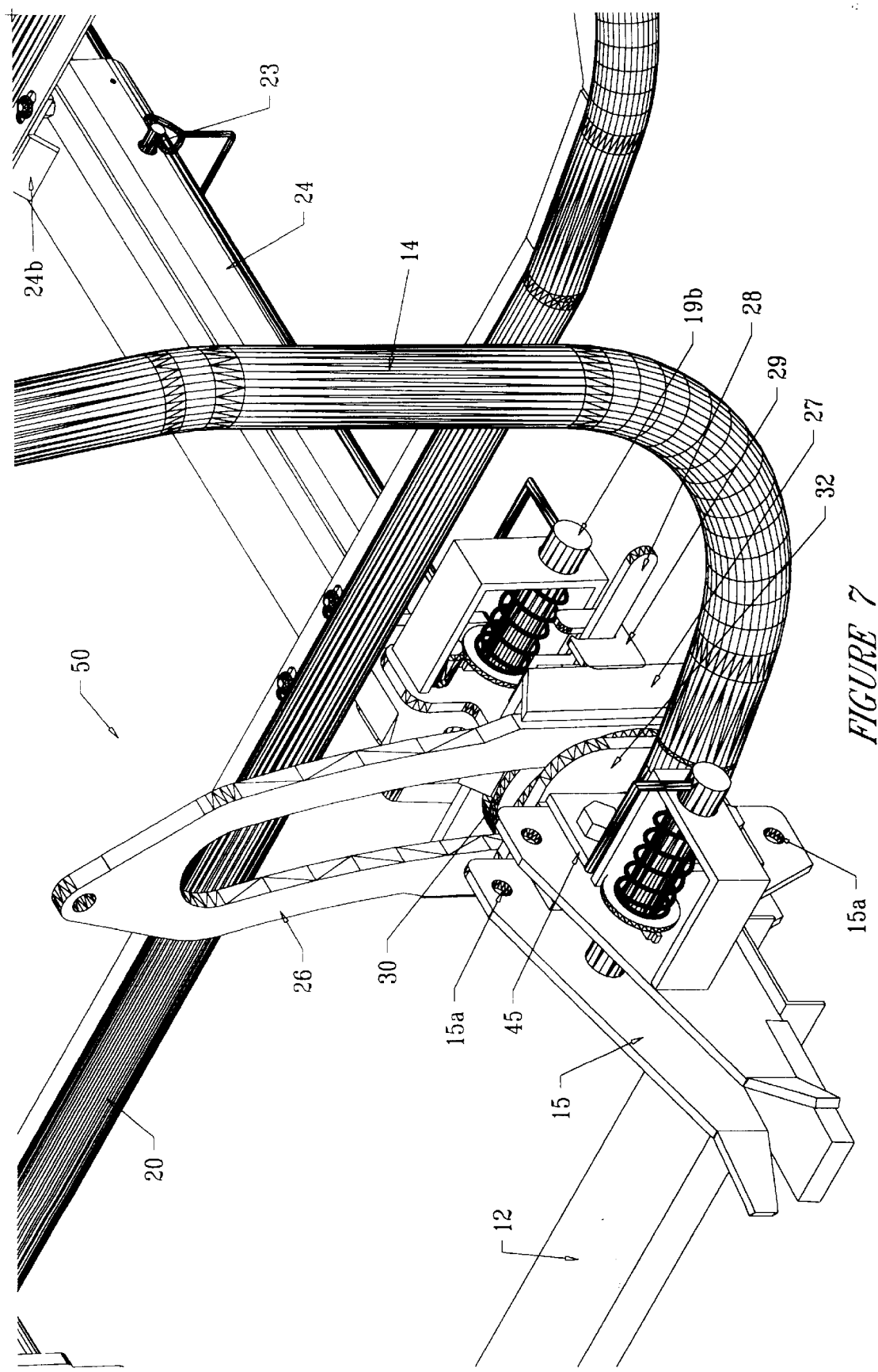
FIG. 7 is a close-up rear perspective view of the yoke assembly of the carrier-platform device in accordance with the preferred embodiment of the present invention, showing the assembly with the carrier platform deployed.
Figure 8:
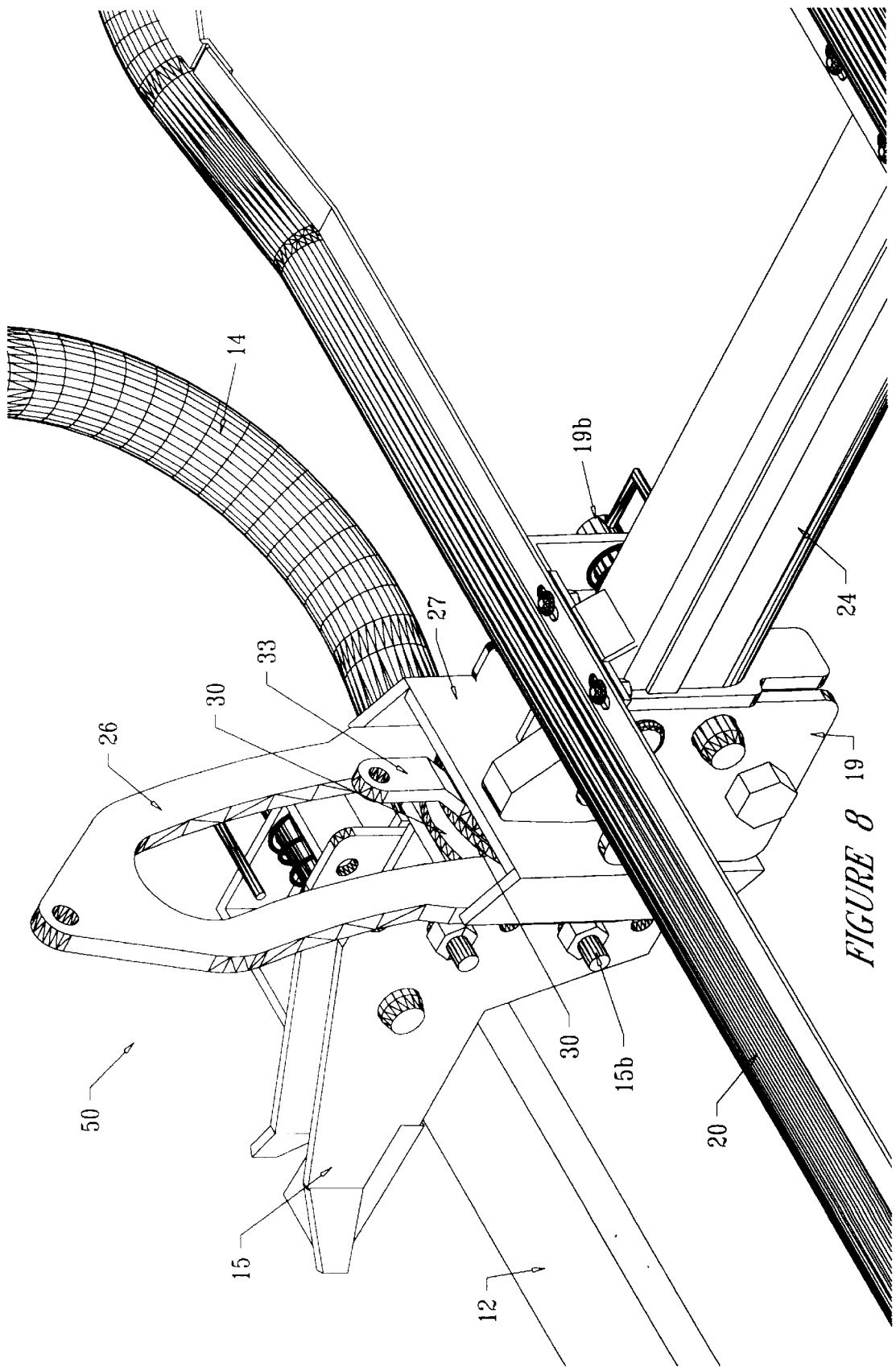
FIG. 8 is a close-up front perspective view of the yoke assembly of the carrier-platform device in accordance with the preferred embodiment of the present invention, showing the assembly with the carrier platform deployed.
Figure 9:
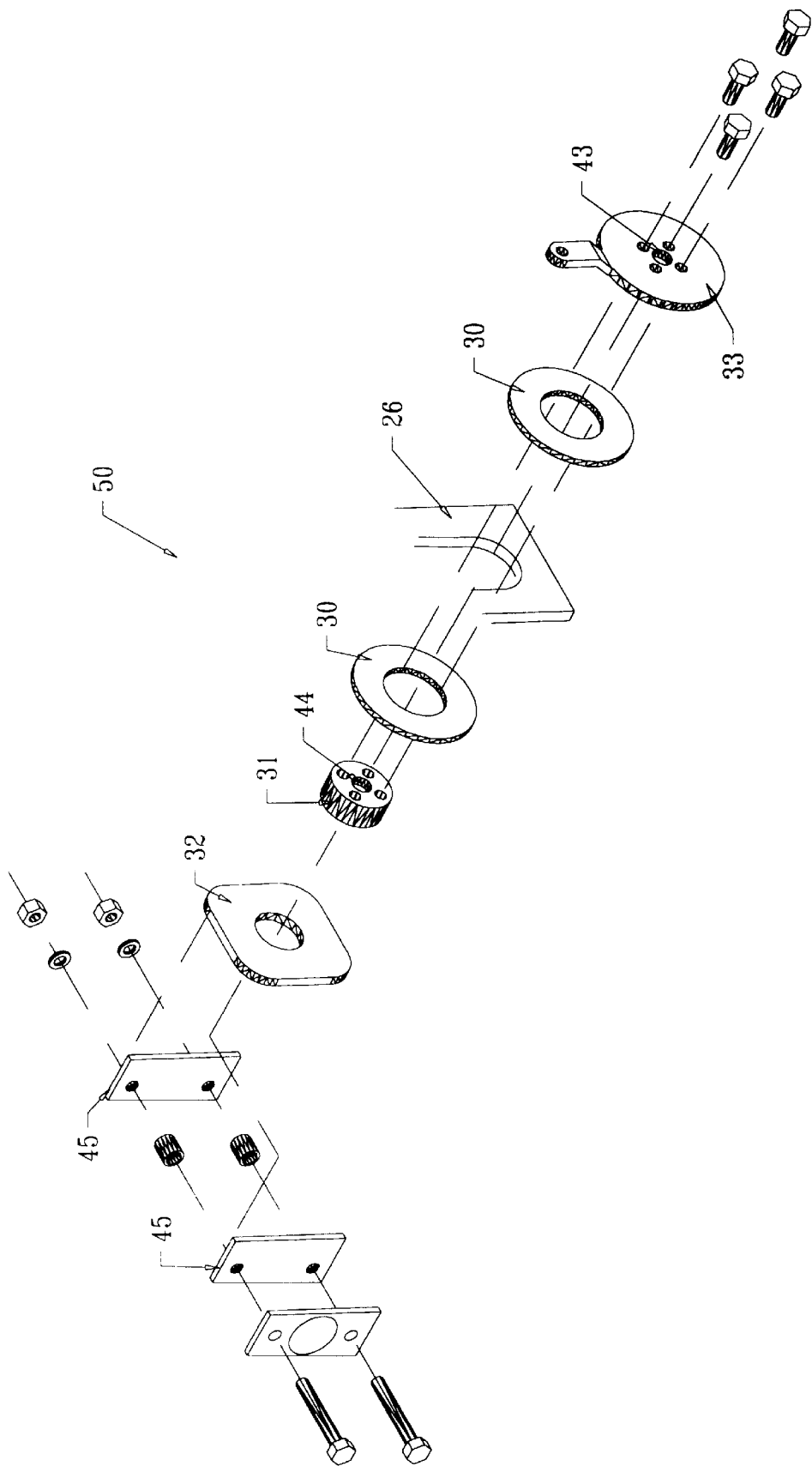
FIG. 9 is an exploded view of the yoke assembly of the carrier-plafform device of the present invention.
Figure 10B:
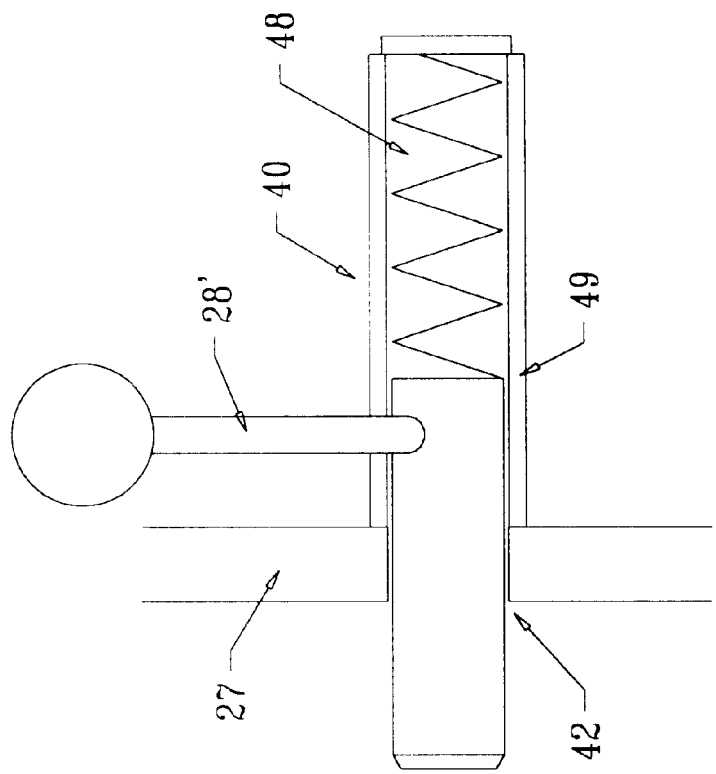
FIGS. 10A & 10B are side views of the preferred configuration of the yoke locking pin of the present invention, shown in FIG. 10A retracted for moving the yoke, and shown in FIG. 10B as fixing the yoke in place.
Figure 10A:
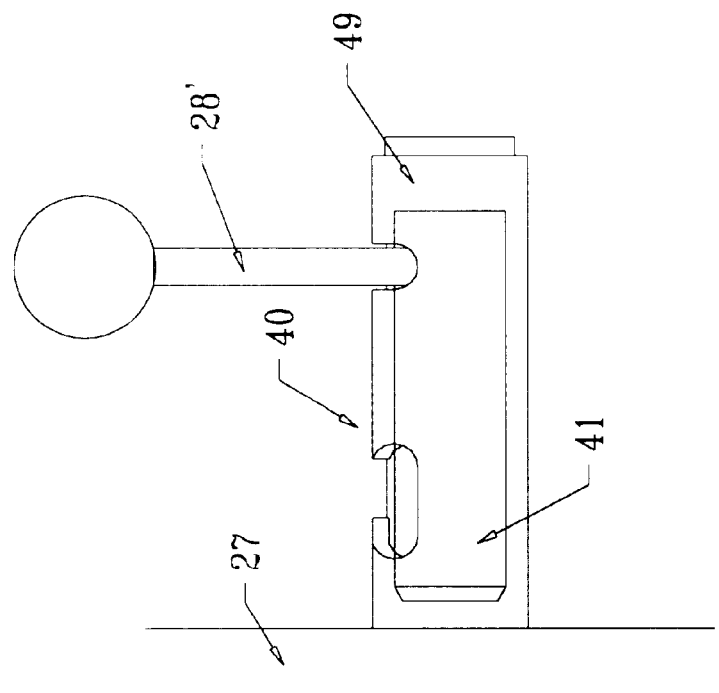

As illustrated in FIGS. 7–9, the yoke 26 forms part of a yoke assembly 50 that further includes a pair of yoke pads 30 having a common yoke bearing 31, all of which are retained within a first retaining plate 32 and a second retaining plate 33. However, as noted, this sliding movement of the yoke 26 and the hinge plate 27 by way of bearing 31 may only occur when a locking pin 41 of a locking pin assembly 40 is in the position shown in FIG. 10A. The locking pin assembly 40 shown in FIGS. 10A and 10B is a preferred alternative to the configuration of the lever 28 and harness 29 shown in FIG. 7. The preferred locking pin assembly 40 includes the locking pin 41, a pin lever 28', a spring 48, and a pin housing 49. When the pin 41 is in the position shown in FIG. 10B, it passes completely through hinge plate opening 42 and through a rotatable retainer opening 43 of second retaining plate 33. It then resides substantially within a yoke bearing center 44 of bearing 31. In that condition, the yoke 26 and hinge plate 27 cannot move upward or downward; however, they are permitted to pivot about bearing 31 when the other of the two yokes is free to move with its hinge plate 27 when the platform 18 is to be pivoted to a tilted position. The yoke assembly 50 is coupled to the support connector 15 preferably by welding it to plates 45 of the support connector 15.

Figure 11:
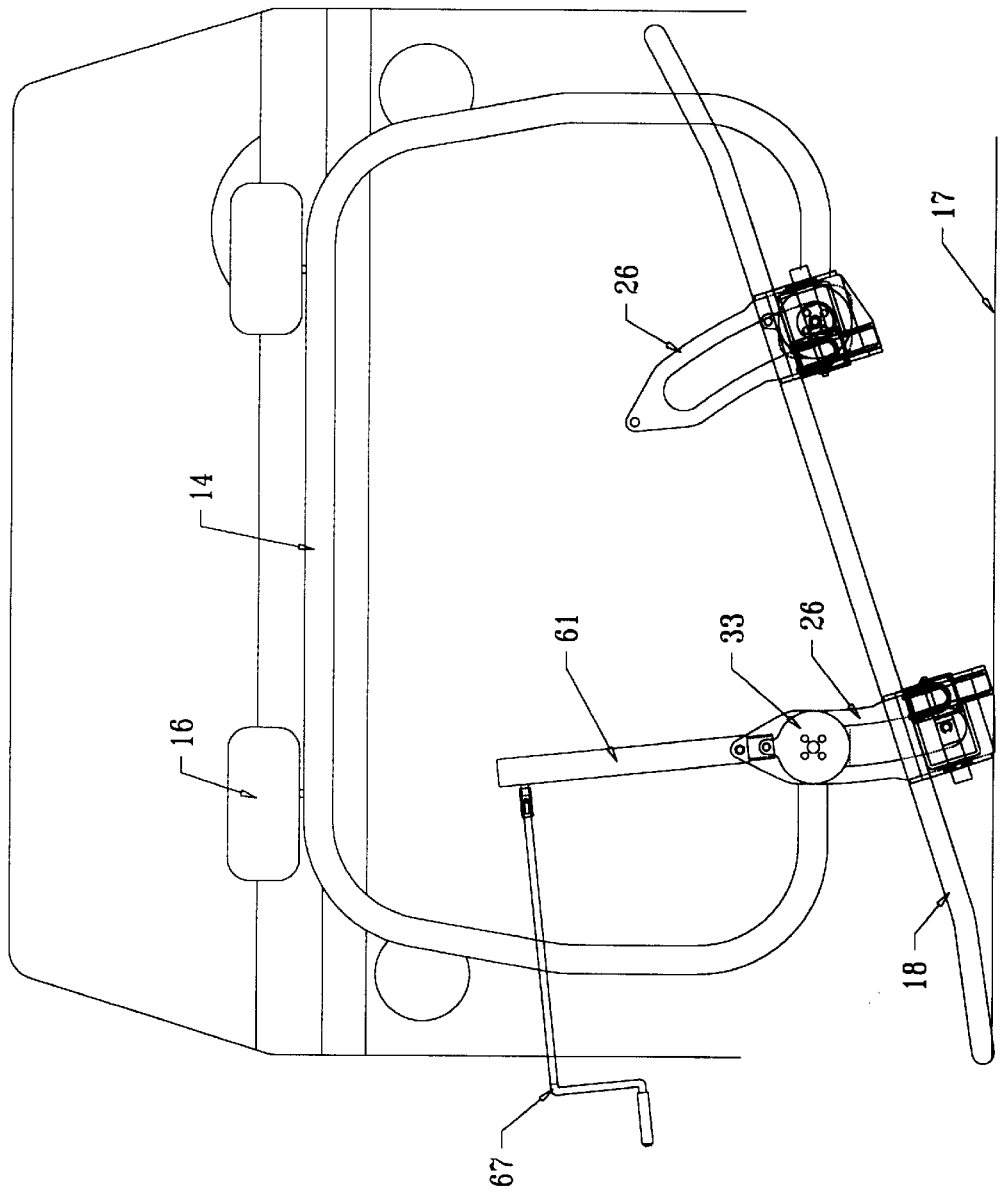
FIG. 11 is a simple front view showing the carrier-plafform device in accordance with the present invention coupled to a vehicle and in a tilted position.
Figure 12:
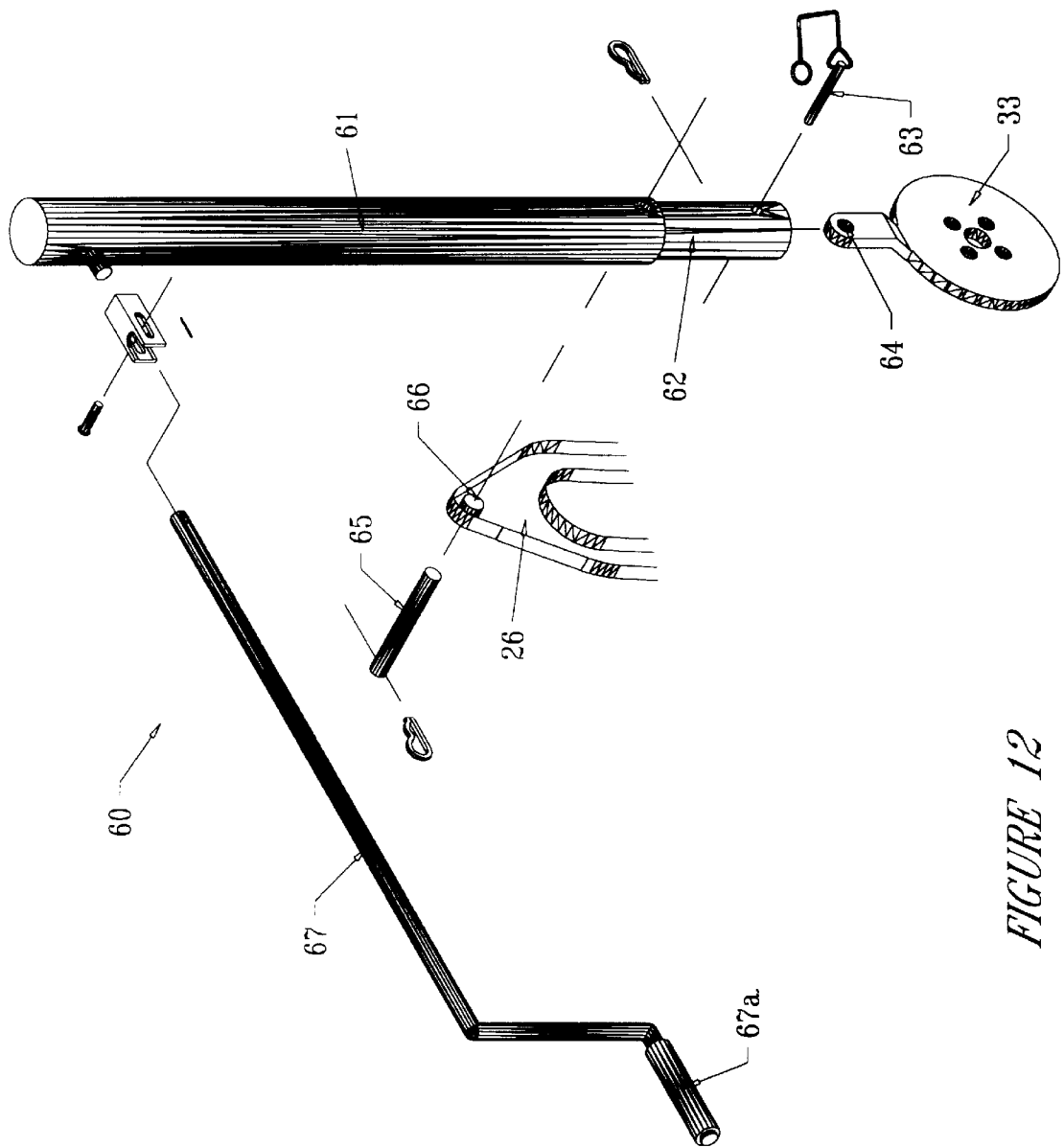
FIG. 12 is an exploded view of a yoke-lifting assembly in accordance with the preferred embodiment of the present invention.

With the locking pin 41 in a released condition as shown in FIG.10A, the platform 18 becomes tilted for loading as shown in FIG. 11. When the item to be carried has been loaded on the platform 18, the platform 18 is righted by drawing the arcuate yoke 26 and the hinge plate 27 upward by any suitable means, including, but not limited to, an electric jack or a manual jack. As illustrated in FIGS. 11–12, a yoke lifting assembly 60 may be used for that purpose. The yoke lifting assembly 60 of the present invention preferably includes a first lifting tube 61 and a second lifting tube 62 residing within the first lifting tube 61. This combination permits adjustment of the overall height of the combination of tubes 61 and 62 as a function of yoke position in that the spaced relationship of the two tubes may be adjusted. In order to lift a yoke in a position resulting in platform tilt, the second lifting tube 62 is detachably coupled to the second retaining plate 33 by way of capture pin 63 and hole 64 and the yoke 26 is detachably connected to the first lifting tube 61 by way of pin 65 and yoke hole 66. Rotation of a lever arm 67 causes the yoke 26 to be pulled upward, as the plate 33 is in a fixed location. While the lever arm 67 is shown to be manually operable by way of a handle 67a, it may easily be coupled to a powered jack for electrical operation. Once the yoke 26 is back in a position shown in any of FIGS. 4–8, the locking pin 41 is locked into place as shown in FIG. 10B.

Figure 14:
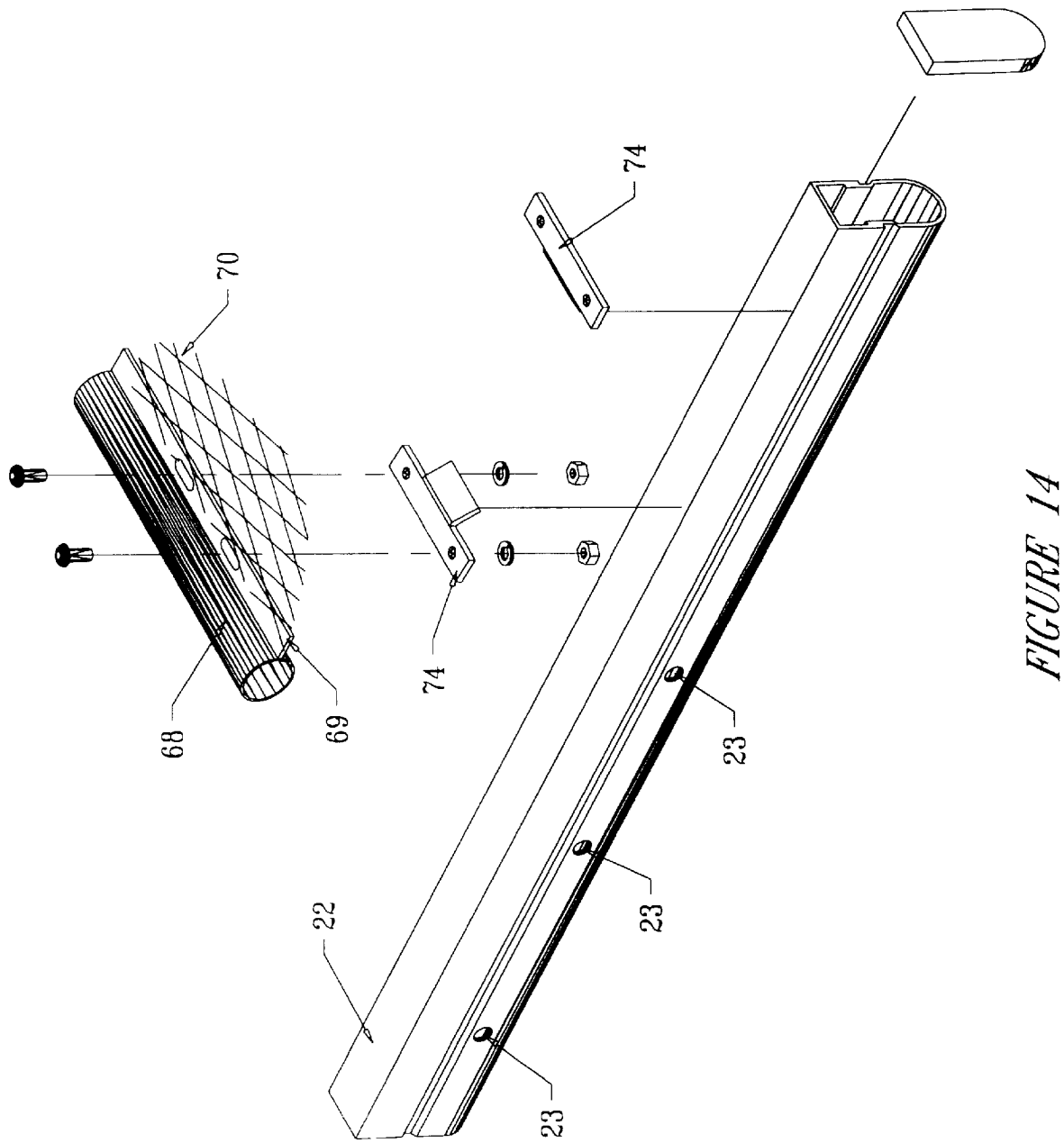
FIG. 14 is an exploded view of an optional extension frame of the present invention.

Platform 20 and movable platform 21 are shown in the prior drawings as relatively simple frames having curved ends. The curved shape of the ends provides a smooth transition for the equipment to be moved from the ground 17 onto the platform 18. That is, this enables a wheeled mechanism to be easily and quickly moved atop the platform 18. As shown in FIG. 13, platform 20 includes a base frame 68 and a retaining frame 69. The base frame 68 is designed to be coupled to the pivotable support 24, preferably by welding or other suitable attachment means. The retaining frame 69 is attached to the base frame 68 in a similar manner. A support grate 70 is preferably included as part of the design so as to provide a suitable structure for retaining equipment, materials, etc., on the platform 18. As shown in FIG. 13A, the retaining frame 69 includes at each corner a coupling corner 71 with D-ring 72 and securing pin 73 for removably securing the grate 70 thereto. It is to be noted that movable platform 21 may be, and preferably is, similarly designed. In particular, as shown in FIG. 14, support 22 for platform 21 includes side grate couplings 74 welded thereto for securing the retaining frame 69 and the platform 70 as desired.

Figure 15:
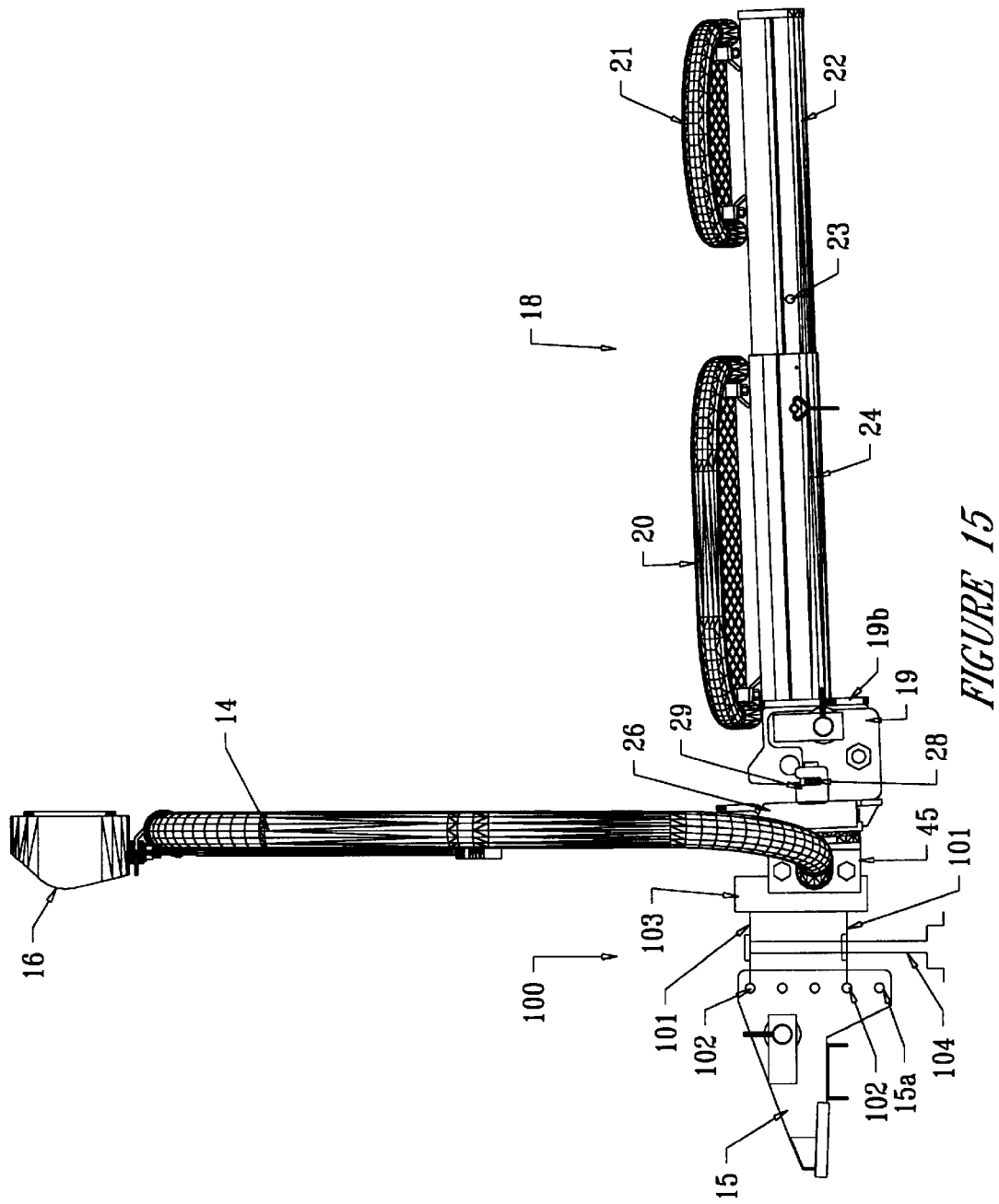
FIG. 15 provides a simplified side view of a supplemental platform lifting mechanism.

As illustrated in FIG. 15, a supplemental lifting mechanism 100 may be coupled between the support connector 15 and the plates 45 of yoke assembly 30. The lifting mechanism 100 includes a pair of parallel racks 101 designed to be rotatably coupled to pins 102 of connector 15, and fixedly connected to plates 45 by way of bar 103. The racks 101 must be of sufficient strength to enable the user to raise and lower the platform 18 with or without something on the frames 20 and 21. A lifting rod 104 is coupled to the racks 101 so as to enable electrical or mechanical actuation of the lifting mechanism 100 upward or downward. It is to be understood that each of the pair of yoke assemblies 30 requires its own lifting mechanism. Actuation of the lifting rod 104 enables pivotal movement of the racks 101 such that the platform 18 may be raised or lowered. In an alternative arrangement not specifically shown in FIG. 15, the lifting mechanism 100 may be one or more columnar components coupled to the platform 18 and to a lifting device looking much like the lifting rod 104, all as is well known to those skilled in this field. The lifting mechanism 100 can be deployed on the front of the vehicle or on the rear of the vehicle as desired.

Figure 16:
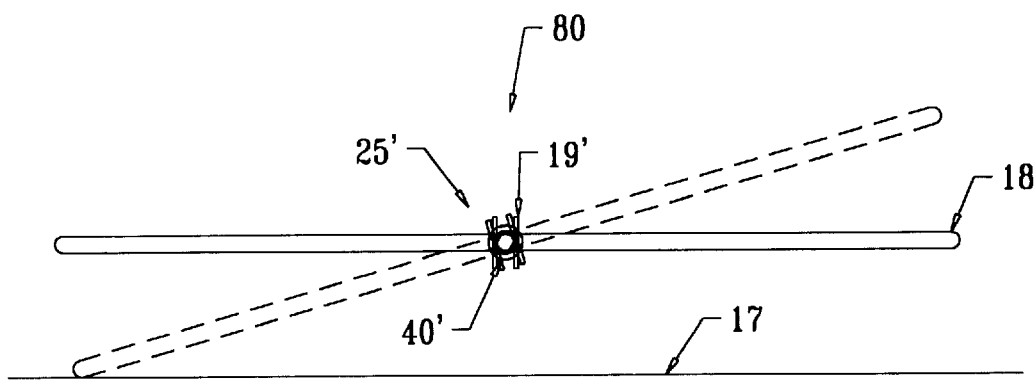
FIG. 16 is a simplified plan view of a first alternative embodiment of the means for pivoting the platform of the present invention toward the ground, showing a single pivot point.

A first alternative design of the means by which the platform 18 may be pivoted so that one side or the other may be dropped towards the ground 17 is shown in FIG. 16. In that alternative design, the pivot means is a centrally-located pivot unit 80 that includes a single base coupling 19' which may be substantially the same as one of the pair of base couplings 19 shown in the other drawings, provided the single coupling 19' is designed to support the entirety of the load expected, including the weight of the platform 18 and the weight of the wheeled mechanism to be carried. Continuing with the first alternative embodiment of the means for pivoting the platform in the third dimension, the centrally-located pivot unit 80 also includes a rotation point that is preferably a protuberance 40' captured within a sleeve 25'. While the platform 18 shown in FIG. 16 is substantially straight, it preferably includes curved ends shown in the other drawings, for ease of loading onto and unloading from the platform 18.

Figure 17:
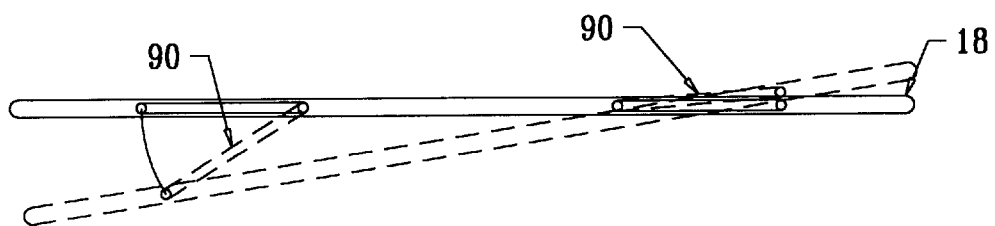
FIG. 17 is a simplified plan view of a second alternative embodiment of the means for pivoting the platform of the present invention toward the ground, showing a pair of offset eccentric pivot arms.
Figure 18:
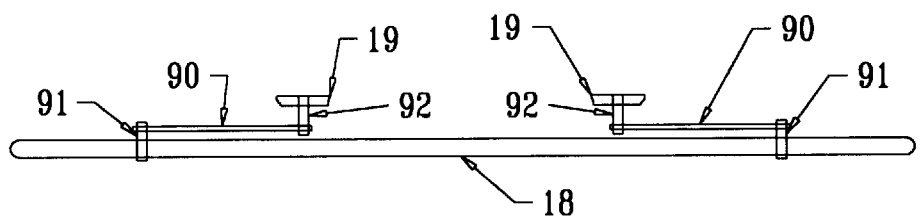
FIG. 18 is a simplified elevation view of the second alternative embodiment of the means for pivoting the platform as shown in FIG. 17.

A second alternative embodiment of the means by which the platform 18 may be pivoted so that a side may be dropped towards the ground 17, or so that the entire platform 18 moves uniformly in one plane, is shown in FIGS. 17 and 18. In the design of the platform pivot means shown in those drawings, a pair of offset eccentric pivotable arms 90 is attachable to the platform 18 by platform pivot pins 91, and to the base couplings 19 by base pivot pins 92. Use of the eccentric arms 90 yields rotation about two axes, and provides more flexibility and travel in the movement of either side or both sides of the platform 18 toward the ground 17, thereby permitting conformance of the platform 18 with steeper underlying terrain. The eccentric arms 90 may be of any type well known to those skilled in this art.

It should be understood that the preferred embodiments described are merely illustrative of the present invention. Variations in design and use of the present invention may be contemplated in view of the following claims without straying from the intended scope and field of the invention herein disclosed.

I claim:

1. A carrier-plafform device for connection to a vehicle bracket, said device comprising:

a) a frame able to be coupled to said vehicle bracket;
   b) a platform hingedly coupled to said frame via a base-coupling device having a locking mechanism, said platform having a first side, a second side, a front end, and a vehicle end, said first side being substantially equal in length and parallel to said second side and said front end being substantially equal in length and parallel to said vehicle end, a surface of said platform extending continuously from said first side to said second side and from said front end to said vehicle end, said platform being deployable between a substantially vertical storage position and a substantially horizontal deployed position;
   c) a horizontal axis that runs perpendicular to a longitudinal axis of said vehicle; and
   d) a platform loading-tilt axis that runs parallel to said longitudinal axis of said vehicle,
   wherein said locking mechanism is releasable so as to enable said platform to pivot about said horizontal axis so that said platform can thereby be developed between said vertical storage position and said horizontal deployed position, and said platform can pivot about said platform loading-tilt axis between said horizontal deployed position and a ramp-like loading position.

2. The carrier-platform device as claimed in claim 1, wherein said platform includes a fixed grate and a movable grate, where said movable grate is slidable within a plane occupied by said platform.

3. The carrier-platform device as claimed in claim 2, wherein said movable grate and said fixed grate are each formed by a section of steel grate within a tubular frame.

4. The carrier-plafform device as claimed in claim 3, wherein said vehicle bracket is a snowplow-receiving bracket located on a vehicle and said frame includes a lighting means mounted thereupon for supplementing light from headlamps of said vehicle.

5. The carrier-platform device as claim in claim 4, wherein said lighting means includes an electrical harness for coupling said lighting means to a power supply of the vehicle.

6. The carrier-platform device as claimed in claim 1 further comprising a platform lifting mechanism coupled between said frame and said vehicle bracket.

7. The carrier-platform device as claimed in claim 6 wherein said lifting mechanism includes a pair of parallel lifting racks.

8. The carrier-platform device as claimed in claim 1 further comprising means to adjust a height of said frame and, thereby, a height of said platform.

9. The carrier-platform device as claimed in claim 1 further comprising means for adjusting a securing tilt of said platform in said vertical storage position, said securing tilt being a tilt of up to 2° to the vertical of said platform toward a front end of said vehicle, and a horizontal position of said platform in said horizontal deployed position, and wherein said means for adjusting said securing tilt and said horizontal position is coupled to said frame.

10. The carrier-plafform device as claimed in claim 2, wherein said movable grate includes a fold-out extension.

11. The carrier-plafform device as claimed in claim 1, wherein said platform can tilt about said loading-tilt axis in such a manner that said platform can be made to tilt in either a first loading-tilt mode or a second loading-tilt mode, said first loading tilt mode lowering said first side toward the ground and said second loading tilt mode lowering said second side toward the ground.

12. A carrier-platform device for connection to a standard snowplow-receiving bracket, said device comprising:
 a) a frame having an attachment means for attachment to said standard snowplow-receiving bracket;
 b) a pair of sleeves affixed to said frame, each of said sleeves having a spring-loaded locking pin;
 c) a pair of frame couplings, each removably coupled to one of each of said pair of sleeves via said spring-loaded locking pins, each of said frame couplings including an arcuate yoke; and
 d) a platform movably mounted on each said hinge of each said frame coupling, each said hinge having a vertical position and a horizontal position;
 wherein releasing one of said frame couplings permits said platform to pivot freely about the other of said frame couplings.

13. The carrier-platform device as claimed in claim 12, wherein said platform includes:
 a) a fixed grate secured to a pair of fixed supports, each said fixed support being secured to each said hinge of said frame couplings, and
 b) a movable grate secured to a pair of movable supports, each said movable support being slidably coupled to said fixed support,
 wherein a distance between said fixed grate and said movable grate is varied by sliding said movable support towards and away from said fixed support.

14. The carrier-platform device as claimed in claim 13, wherein said movable grate and said fixed grate are each formed by a section of steel grate within a tubular frame.

15. The carrier-platform device as claimed in claim 14, wherein said standard snowplow-receiving bracket is located on a vehicle and said frame includes a lighting means mounted thereupon for supplementing light from headlamps of said vehicle.

16. The carrier-platform device as claimed in claim 15, wherein said movable grate and said fixed grate each include upturned ends.

17. A carrier-platform device for connection to a standard bracket attachable to a vehicle, said device comprising:
 a) a frame able to be coupled to said standard bracket;
 b) a platform coupled to said frame via coupling means having a locking mechanism and a horizontal axis that runs perpendicular to a longitudinal axis of said vehicle, said platform having a first side, a second side, a front end, and a vehicle end, said first side being substantially equal in length and parallel to said second side and said front end being substantially equal in length and parallel to said vehicle end, a surface of said platform extending continuously from said first side to said second side and from said front end to said vehicle end; and
 c) a pivot means having a platform loading-tilt axis that runs parallel to said longitudinal axis of said vehicle,
 wherein said locking mechanism is releasable to enable said platform to pivot on said coupling means about said horizontal axis between said vertical storage position and said horizontal deployed position, and wherein said platform can tilt about said platform loading-tilt axis between said horizontal deployed positon and a ramp-like loading position.

18. The carrier-platform device as claimed in claim 17, wherein said pivot means includes a single pivot-coupling centrally-located on said frame and said plafform can tilt about said loadinga-tilt axis in such a manner that said platform can be made to tilt in either a first loading-tilt mode or a second loading-tilt mode, said first loading tilt mode lowering said first side toward the ground and said second loading tilt mode lowering said second side toward the ground.

19. The carrier-platform device as claimed in claim 18, wherein said single pivot-coupling includes a sleeve capturing a releasable pivotable yoke.

20. The carrier-platform device as claimed in claim 17, wherein said pivot means includes a pair of offset eccentric pivot arms.

\* \* \* \* \*